US 6,637,148 B1

(12) United States Patent
Stallings

(10) Patent No.: US 6,637,148 B1
(45) Date of Patent: Oct. 28, 2003

(54) CIRCLE HOOK WITH BAITHOLDER

(76) Inventor: Timothy Darrel Stallings, 763 Fire Tower Rd., Wetumpka, AL (US) 36092

( * ) Notice: Subject to any disclaimer, the term of this patent is extended or adjusted under 35 U.S.C. 154(b) by 0 days.

(21) Appl. No.: 10/153,657

(22) Filed: May 24, 2002

(51) Int. Cl.[7] .................. A01K 83/06; A01K 83/00
(52) U.S. Cl. ...................... 43/44.8; 43/43.16
(58) Field of Search ............. 43/43.16, 44.2, 43/44.8, 44.82; D22/144

(56) References Cited

U.S. PATENT DOCUMENTS

| | | | | |
|---|---|---|---|---|
| 70,913 A | | 11/1867 | Sterling | 43/44.8 |
| 141,910 A | * | 8/1873 | Allen | 43/43.16 |
| 377,033 A | * | 1/1888 | Kerrison, Jr. | 43/43.16 |
| 385,913 A | | 7/1888 | Hunter | 43/44.8 |
| 551,582 A | | 12/1895 | Crane | 43/44.8 |
| 627,179 A | * | 6/1899 | Dreese | 43/43.16 |
| 648,552 A | * | 5/1900 | Crane | 43/43.16 |
| 745,221 A | | 11/1903 | Miller | 43/44.2 |
| 911,040 A | * | 2/1909 | Hickey | 43/44.8 |
| 1,249,342 A | * | 12/1917 | Dahl | 43/44.82 |
| 1,533,092 A | | 4/1925 | Bonbright | 43/44.8 |
| 1,613,113 A | | 1/1927 | Leu | 43/44.4 |
| 1,706,881 A | * | 3/1929 | Hampson | 43/43.16 |
| 1,961,378 A | | 6/1934 | Mitchell | 43/44.8 |
| 2,087,369 A | * | 7/1937 | Woodring | 43/44.8 |
| 2,215,613 A | | 9/1940 | Hathaway | 43/44.6 |
| 2,222,554 A | | 11/1940 | Wirth et al. | 43/44.4 |
| 2,233,863 A | * | 3/1941 | Driscoll | 43/43.16 |
| 2,266,725 A | * | 12/1941 | Andrews | 43/44.8 |
| 2,719,380 A | * | 10/1955 | Place | 43/44.8 |
| 2,781,605 A | * | 2/1957 | Eilermann | 43/44.2 |
| 2,962,834 A | | 12/1960 | Stinson | 43/44.6 |
| 2,995,858 A | | 8/1961 | Rathmann | 43/44.8 |
| 3,061,968 A | * | 11/1962 | Stroud | 43/44.8 |
| 3,130,514 A | * | 4/1964 | Cornick | 43/43.16 |
| D250,825 S | | 1/1979 | Childre | D22/144 |
| 4,251,942 A | | 2/1981 | Jacobus | 43/44.8 |
| 4,802,300 A | * | 2/1989 | Fujii et al. | 43/43.16 |
| 4,905,402 A | * | 3/1990 | Clark | 43/43.16 |
| 4,914,852 A | * | 4/1990 | Hnizdor | 43/44.82 |
| 5,077,931 A | * | 1/1992 | Marshall | 43/44.8 |
| 5,237,772 A | | 8/1993 | Gibbs | 43/44.8 |
| 6,038,806 A | | 3/2000 | Maitland | 43/44.8 |
| 6,237,277 B1 | | 5/2001 | Hildman | 43/43.16 |
| 6,357,168 B1 | * | 3/2002 | Leu | 43/43.16 |

FOREIGN PATENT DOCUMENTS

| | | | | | |
|---|---|---|---|---|---|
| AU | 108745 B1 | * | 10/1939 | | 43/44.8 |
| DE | 10026293 B1 | * | 12/2001 | | |
| EP | 380735 B1 | * | 8/1990 | | |
| GB | 1433 B1 | * | 1/1884 | | 43/44.8 |
| GB | 26904 B1 | * | 12/1902 | | 43/44.8 |
| GB | 177312 B1 | * | 3/1922 | | 43/44.8 |
| JP | 4-166031 B1 | * | 6/1992 | | |
| JP | 6-269236 B1 | * | 9/1994 | | |
| JP | 9-266742 B1 | * | 10/1997 | | |
| JP | 9-298982 B1 | * | 11/1997 | | |
| JP | 11-225621 B1 | * | 8/1999 | | |
| JP | 2002-125521 B1 | * | 5/2002 | | |
| JP | 2002-153165 B1 | * | 5/2002 | | |

* cited by examiner

*Primary Examiner*—Darren W. Ark
(74) *Attorney, Agent, or Firm*—Dickinson Wright PLLC

(57) ABSTRACT

The invention relates to a circle hook having a protrusion on the shank extending down from the eye at a location that helps to prevent the bait on the hook from sliding up the shank and into the gap between the tip and shank. The protrusion preferably extends inward in relation to the curved portion of the hook to prevent harm to the fish, and is located at or near the point where the tip points toward the shank portion to keep the bait away from the gap and substantially control the location of the bait on the hook.

16 Claims, 1 Drawing Sheet

CIRCLE HOOK WITH BAITHOLDER

FIELD OF THE INVENTION

The present invention relates to a circle hook, and in particular, a circle hook that has a baitholder thereon.

SUMMARY OF THE INVENTION

In the fishing industry, many recreational anglers fish only for sport. For example, recreational anglers typically go out on private, rented or chartered boats to catch fish, such as marlin, shark and tuna, as well as billfish and sailfish species. To them, the thrill of the sport is the appeal, not the actual fish that they catch. If the fish is the right size and kind, the angler may want to keep the fish for mounting and display purposes, or take a few measurements to make a plastic mount. Also, if the fish is not the right size and kind, the angler may just decide to let the fish die, or take only a few precautions before throwing it back, giving the fish little chance of survival.

A practice known as "catch and release" was introduced to reduce the number of fish caught and unnecessarily killed as a result of recreational angling and other practices. The angler catches the fish, and once satisfied with having caught the fish, releases the fish back into the water. While there are still issues regarding the post-release survival rate of particular kinds of fish, such as red drum, spotted seatrout, summer flounder, bluefish, striped bass, weakfish, catfish, stripers, etc., the practice was designed to give fish a better chance of survival. If the released fish survive, they can be made available for future anglers, i.e., to replenish the sport. If the released fish are capable of human consumption, they can be made available for future fishermen, commercial or otherwise. In either case, the catch and release method can result in less stress to the particular species being caught, and therefore, can help conserve future fish populations.

In the past, a particular kind of hook termed a "circle hook" was used to promote the catch and release method. A circle hook is one where the pointed end of the hook circles back and points toward the shank, leaving only a relatively small gap between the point and shank through which the fish's mouth can be hooked. This feature makes it less likely that the fish will be throat-hooked or gut-hooked; with a circle hook, the fish is more likely to be only "lip-hooked." Being lip-hooked can enable the hook to be more easily released from the fish's mouth, thereby avoiding the injuries that can result from the hook being caught in the throat, i.e., the damage that can occur when the fish struggles on the line or when the fisherman attempts to release the hook from deep inside the fish's throat. This way, the fish can avoid mortal injury, and can be released back into the water, with an increased chance of survival.

One problem associated with past circle hooks of this type has been the inability to keep the bait from sliding into the gap, and therefore, interfering with the catch. Because, on a circle hook, the point faces the shank, and only a relatively small gap exists between the point and shank, if the bait slides into the gap, it can prevent the fish's mouth from engaging the point, and therefore, make it more difficult to catch fish.

What is needed, therefore, is a new design for a circle hook that has a baitholder built in.

SUMMARY OF THE INVENTION

The present invention relates to an improvement in circle hooks designed to make the circle hook more effective in catching fish. The improvement relates to a small baitholder strategically located on the inside curvature of the hook. The baitholder is preferably formed by a small slice taken out of the shank, creating a pointed protrusion that points relatively down the shank away from the eye and toward the curved portion of the hook. The direction that the protrusion points is intended to make the baitholder more effective in preventing the bait from sliding up the shank.

Moreover, the protrusion is preferably located on the shank where the tip of the hook points toward the shank, or slightly below that point, such that when the bait is placed on the hook, it can be held along the curved portion away from the gap. Keeping the bait away from the gap can help improve the chances of catching fish by not allowing the bait to interfere with the fish's mouth. The present invention also contemplates providing a relatively tight curvature at a particular location on the curved portion, to help prevent the bait from sliding too far in the opposite direction. By controlling the location of the bait on the hook, the present invention can help improve the ability of the hook to catch fish.

DETAILED DESCRIPTION OF THE INVENTION

Figure 1:
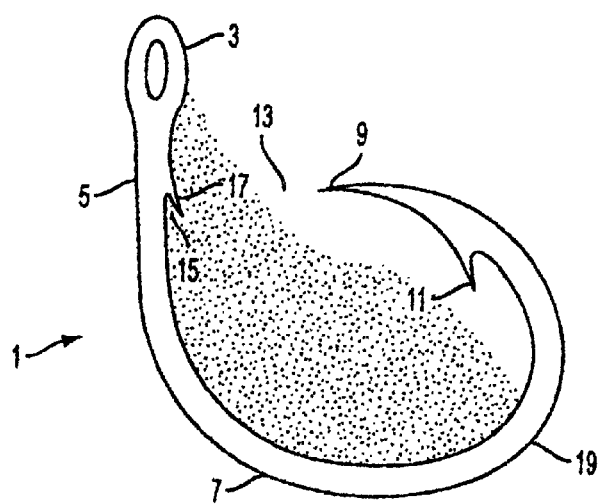
FIG. 1 shows a fishing hook of the present invention.

FIG. 1 shows the circle hook 1 of the present invention having an eye 3, a shank portion 5 extending from the eye 3, and a curved portion 7 extending from the shank portion 5 in a curved manner. The curved portion 7 preferably extends around the hook about 270 degrees from the shank portion 5, and forms a tip 9 at its distal end. The tip 9 is preferably pointed and points back toward the shank portion 5 due to the curvature of the curved portion 7. This configuration forms a gap 13 between the tip 9 and shank portion 5. A barb 11 is preferably provided on the inside of hook 1, although hooks without barbs are within the contemplation of the invention.

Gap 13 preferably extends a predetermined distance to enable certain size fish, with certain size mouths, to be hooked. In this respect, hook 1 is preferably adapted with a gap 13 that is narrow enough so that only the fish's mouth can enter the gap 13, which is where the mouth has to be to be pierced by tip 9. Because of the curvature of curved portion 7, no other part of the mouth and throat can be pierced, and therefore, the fish caught by hook 1 can only be lip-hooked, not throat-hooked or gut-hooked. Being lip-hooked makes it so that hook 1 can be more easily removed from the fish's mouth without substantial harm to the fish.

The present invention helps to prevent the bait (not shown) which is placed on the curved portion 7 from sliding up the shank portion 5 and into the gap 13 by means of a baitholder 17. Having the bait located inside the gap 13 can make it difficult for the fish to be caught, insofar as the bait can interfere with the fish's ability to get its mouth positioned in the gap 13. The present invention can solve this problem by providing a baitholder protrusion 17 located on shank portion 5 along the inside of curved portion 7. The protrusion 17 is preferably formed by a small slice 15 taken out of shank portion 5, creating a pointed protrusion on shank portion 5 that points relatively down the shank away from eye 3 and toward curved portion 7. The protrusion 17 preferably points toward the inside of curved portion 7 to make the baitholder effective in preventing the bait from sliding up shank portion 5 and into gap 13, while at the same time, preventing the protrusion 17 from harming the fish.

Also, protrusion 17 is preferably located substantially at or near where the tip 9 points toward shank portion 5, so that the location of the bait on the curved portion 7 can be substantially maintained to keep the bait from sliding into gap 13. The present invention contemplates that protrusion 17 can be located at or near where tip 9 points toward shank portion 5, preferably within the following range (which is a function of the size of gap 13): an upper limit on shank 5 (toward eye 3) which is determined by an imaginary line extending from tip 9 at about 10 degrees above a line perpendicular to shank portion 5 from tip 9, and a lower limit on shank 5 (toward curved portion 7) which is determined by an imaginary line extending from tip 9 at about 20 degrees below a line perpendicular to shank portion 5 from tip 9. If protrusion 17 is located above that range, i.e., closer to eye 3, the bait could still slide up shank portion 5 and into gap 13, thereby defeating the purpose of having the baitholder on the hook. And locating protrusion 17 below that range, i.e., closer to curved portion 7, may cause the hook 1 to be unnecessarily weakened.

Various dimensions on hook 1 help to make it perform in the intended manner. For example, gap 13 can be sized for a particular type of fish, based on the size of the fish's mouth. That is, gap 13 can be sized to allow mouths of certain kinds of fish to enter within gap 13 (where it can be pierced by tip 9), while not enabling mouths of other kinds of fish to enter. If the fish's mouth is too large, the fish will not be able to get its mouth into the gap 13, and the fish will be prevented from being caught. As discussed above, the narrowness of gap 13, as well as curved portion 7, can help to control the depth to which the tip 9 of hook 1 can pierce the fish's mouth, thereby helping to avoid throat-hooking.

Another feature of the present invention that helps to prevent the bait from sliding down curved portion 7 and toward tip 9 is a relatively tight bend 19 located about one-half to two-thirds of the way along the curved portion 7 from shank portion 5. The relative tightness of bend 19 can help to prevent the bait from sliding along the curved portion 7 past the bend 19, thereby helping to control the location of the bait on hook 1. Of course, any barb 11 provided on hook 1 can prevent the bait from sliding completely off of hook 1. In conjunction with protrusion 17, the present invention contemplates that bend 19 can help to substantially control the location of the bait on the hook 1, to help improve the chances of catching fish thereon.

The hook 1 can be made of any conventional material, such as carbon steel, stainless steel, etc. The protrusion 17 can be made by slicing or otherwise cutting at 15 the shank portion 5 at the predetermined location, thereby causing a section of the shank portion 5 to protrude outward to form a point. By slicing the shank portion 5 at an angle upward toward the eye 3, the protrusion 17 can be made to point down the shank portion 5, away from eye 3, which is the preferred orientation. By pointing the protrusion in this direction, any bait positioned on curved portion 7 will be prevented from sliding up the shank and into gap 13. The present invention also contemplates that protrusion 17 can be made by connecting a structure of a predetermined size and shape, i.e., by welding or the like, onto shank portion 5 at the predetermined location and in the predetermined direction.

What is claimed is:

1. A fishing hook comprising:
    an eye for connecting to a fishing line;
    a shank portion extending in a first direction from said eye;
    a curved portion extending from said shank portion having a tip at a distal end, wherein said curved portion is substantially curved around about 270 degrees in a manner that causes the tip to be pointed substantially toward said shank portion;
    a gap formed between said tip and said shank portion; and
    a protrusion on said shank portion extending inward in relation to said curved portion and in a direction substantially away from said eye, said protrusion being located on said shank portion substantially within a range between an upper limit determined by a line extending from said tip at about 10 degrees above a line perpendicular to said shank portion, and a lower limit determined by a line extending from said tip at about 20 degrees below a line perpendicular to said shank portion.

2. The fishing hook of claim 1, wherein said protrusion is formed by a slice taken out of said shank portion in a direction angled toward said eye, so as to form a point on said protrusion pointing substantially away from said eye.

3. The fishing hook of claim 1, wherein said tip points toward the location where said protrusion is located on said shank portion.

4. The fishing hook of claim 1, wherein said curved portion has a relatively tight bend located at about half-way along said curved portion between said tip and said shank portion.

5. The fishing hook of claim 1, wherein the distance that the gap extends between the tip and shank portion is slightly less than about one-half an overall width of said curved portion.

6. A fishing hook comprising:
    an eye for connecting to a fishing line;
    a shank portion extending in a first direction from said eye;
    a curved portion extending from said shank portion having a tip at a distal end, wherein said curved portion is substantially curved around about 270 degrees in a manner that causes the tip to be pointed substantially toward said shank portion;
    a gap formed between said tip and said shank portion; and
    a protrusion on said shank portion extending inward in relation to said curved portion and in a direction substantially away from said eye, said protrusion helping to prevent bait on said curved portion from sliding up said shank portion and into said gap when the bait is mounted on the hook, and wherein said protrusion is formed by a slice taken out of said shank Portion in a direction angled toward said eye, so as to form a point on said protrusion pointing substantially away from said eye.

7. The fishing hook of claim 6, wherein said protrusion is located on said shank portion at substantially a location where the tip points toward the shank portion.

8. The fishing hook of claim 6, wherein said curved portion has a relatively tight bend located at about half-way along said curved portion between said tip and said shank portion.

9. The fishing hook of claim 6, wherein the distance that the gap extends between the tip and shank portion is slightly less than about one-half an overall width of said curved portion.

10. The fishing hook of claim 6, wherein said protrusion is located on said shank portion at or near the location where the tip points toward the shank portion.

11. The fishing hook of claim 6, wherein said protrusion is located on said shank portion substantially within a range between an upper limit determined by a line extending from said tip at about 10 degrees above a line perpendicular to said shank portion, and a lower limit determined by a line extending from said tip at about 20 degrees below a line perpendicular to said shank portion.

12. A fishing hook comprising:

an eye for connecting to a fishing line;

a shank portion extending in a first direction from said eye;

a curved portion extending from said shank portion having a tip at a distal end, wherein said curved portion is substantially curved around about 270 degrees in a manner that causes the tip to be pointed substantially toward a predetermined location on said shank portion;

a gap formed between said tip and said shank portion; and a protrusion on said shank portion extending inward in relation to said curved portion and in a direction substantially away from said eye, said protrusion being located at or near said predetermined location, and helping to prevent bait on said curved portion from sliding up said shank portion and into said gap when the bait is mounted on the hook, and wherein said protrusion is formed by a slice taken out of said shank portion in a direction angled toward said eye, so as to form a point on said protrusion pointing away from said eye.

13. The fishing hook of claim 12, wherein said curved portion has a relatively tight bend located at about half-way along said curved portion between said tip and said shank portion.

14. The fishing hook of claim 12, wherein the distance that the gap extends between the tip and shank portion is slightly less than about one-half an overall width of said curved portion.

15. The fishing hook of claim 12, wherein said protrusion is located on said shank portion at said predetermined location.

16. The fishing hook of claim 12, wherein said protrusion is located on said shank portion substantially within a range between an upper limit determined by a line extending from said tip at about 10 degrees above a line perpendicular to said shank portion, and a lower limit determined by a line extending from said tip at about 20 degrees below a line perpendicular to said shank portion.

* * * * *